US010301087B2

(12) United States Patent
Giuliano

(10) Patent No.: US 10,301,087 B2
(45) Date of Patent: May 28, 2019

(54) BOTTLE FOR DISPOSABLE ONE TIME USE SUBSTANCE CONTAINER

(71) Applicant: Angelo Giuliano, Clarens (CH)

(72) Inventor: Angelo Giuliano, Clarens (CH)

( * ) Notice: Subject to any disclaimer, the term of this patent is extended or adjusted under 35 U.S.C. 154(b) by 0 days.

(21) Appl. No.: 15/553,587

(22) PCT Filed: Mar. 22, 2016

(86) PCT No.: PCT/IB2016/051602
§ 371 (c)(1),
(2) Date: Aug. 25, 2017

(87) PCT Pub. No.: WO2016/157025
PCT Pub. Date: Oct. 6, 2016

(65) Prior Publication Data
US 2018/0086519 A1    Mar. 29, 2018

(30) Foreign Application Priority Data
Mar. 27, 2015  (EP) ..................... 15161288

(51) Int. Cl.
*B65D 51/28*   (2006.01)
*A47J 43/27*   (2006.01)
(Continued)

(52) U.S. Cl.
CPC .......... *B65D 51/2878* (2013.01); *A47J 43/27* (2013.01); *A61J 7/0046* (2013.01); *A61J 9/00* (2013.01);
(Continued)

(58) Field of Classification Search
CPC .......... A47J 31/40; A47J 31/407; A47J 43/27; A61J 9/00; A61J 11/00; A61J 7/00;
(Continued)

(56) References Cited

U.S. PATENT DOCUMENTS 5,794,802 A * 8/1998 Caola ................. A61J 1/2093
                                                    206/219
7,810,661 B2 * 10/2010 Murphy ................ A61J 9/00
                                                    206/219
(Continued)

FOREIGN PATENT DOCUMENTS

WO   WO2014056079 A1   4/2014

OTHER PUBLICATIONS

International Search Report dated Jun. 29, 2016.
Written Opinion of the International Search Authority dated Jun. 29, 2016.

*Primary Examiner* — Bryon P Gehman
(74) *Attorney, Agent, or Firm* — Andre Roland S.A.; Nikolaus Schibli

(57) ABSTRACT

The present invention relates to a bottle comprising: a lower section, a container for enclosing and holding a first substance, the container being located inside the bottle, a lid for closing the container, an upper section connected to the lower section and for holding a second substance above the lid, a seal located between the lid and the container to assure that the second substance contained in the upper section does not mix with the first substance of the container (9), and a push-release system to displace the lid to permit mixing of the first and second substances. The push-release system includes the container movably mounted in the bottle between a first position where the container does not act on the lid and a second position in which the entire container is displaced to displace the lid to permit mixing of the first and second substances.

20 Claims, 11 Drawing Sheets

(51) Int. Cl.
    *B65D 25/08*     (2006.01)
    *B65D 81/32*     (2006.01)
    *A61J 7/00*     (2006.01)
    *A61J 9/00*     (2006.01)
    *A61J 11/00*     (2006.01)
    *B65D 1/02*     (2006.01)
    *B65D 41/04*     (2006.01)

(52) U.S. Cl.
    CPC .............. *A61J 9/008* (2013.01); *A61J 11/008* (2013.01); *B65D 1/0246* (2013.01); *B65D 25/082* (2013.01); *B65D 41/04* (2013.01); *B65D 81/3205* (2013.01); *B65D 81/3211* (2013.01); *B65D 81/3222* (2013.01)

(58) Field of Classification Search
    CPC .......... A61J 7/0046; A61J 9/008; A61J 11/08; B65D 1/02; B65D 25/08; B65D 41/04; B65D 51/28; B65D 81/32; B65D 1/0246; B65D 25/082; B65D 51/2878; B65D 81/3205; B65D 81/3211; B65D 81/3222
    USPC ........... 206/219, 222; 215/11.1, 11.6, DIG. 8
    See application file for complete search history.

(56) References Cited

U.S. PATENT DOCUMENTS

| | | |
|---|---|---|
| 8,371,440 B2 | 2/2013 | Questad et al. |
| 9,549,633 B2 * | 1/2017 | Ng .................. A47J 43/27 |
| 2008/0156763 A1 | 7/2008 | Murphy |
| 2011/0253564 A1 | 10/2011 | Fernandez De Castro |
| 2012/0318766 A1 | 12/2012 | Questad et al. |

* cited by examiner (a) (b)

BOTTLE FOR DISPOSABLE ONE TIME USE SUBSTANCE CONTAINER

CROSS REFERENCE TO RELATED APPLICATIONS

The present application is a U.S. national stage application of PCT/IB2016/051602 filed on Mar. 22, 2016 designating the United States, and claims foreign priority to European Patent Application EP 15161288.4 filed on Mar. 27, 2015, the contents of both documents being herewith incorporated by reference in their entirety.

TECHNICAL FIELD OF THE INVENTION

The present invention generally relates to a bottle, and more particularly to a drinking bottle for children and/or adults. In particular, the present invention concerns a bottle configured for use with a substance container that is disposable and to be used only once by a bottle user. The present invention thus relates to a 'disposable one-time use container' bottle that receives, holds or employs a disposable one-time use container containing one substance that is to be mixed with another substance.

The present invention further relates to a bottle that allows two substances to be stored separately in the bottle, transported separately inside the bottle as well as allowing the substances to be mixed only when it is desired by the bottle user.

BACKGROUND OF THE INVENTION

In the supplement industry there is a need for a bottle that allows one to carry a mixable substance or powder in a way that is easy to use and mix. Storing the supplement powders in a separate compartment outside the bottle and then adding the powder and possibly liquid to the bottle is time consuming and often messy. This is a relatively easy task if you are at home. However, if you want to mix your powders on the go, there is no easy or convenient way to do it. It involves stopping what you are doing, taking out your bottle and powder container, and physically putting the powder and possibly water inside the bottle.

Patent application WO2014/056079 provides one possible solution to this above inconvenience by providing a bottle in which a powder compartment is located in an upper part of the bottle with a liquid located in a lower part of the bottle. The powder is stored separately from the liquid and released into the liquid by pushing a plunger in the powder compartment of the bottle.

U.S. Pat. No. 8,371,440 discloses a baby bottle having a powder compartment located in a lower part of the bottle. A user pushes a plunger in the powder compartment to remove a compartment lid to allow the baby powder to mix with the liquid contained in a remaining portion of the bottle.

However, the above known bottles employ substance mixing systems and substance compartments that are impractical, complex, inconvenient and unsuitable for use with a disposable one-time use powder or substance container in view of the fact that such disposable one-time use containers as well as the substance mixing systems should be manufactured using a minimal amount of material to minimise their environmental impact.

SUMMARY OF THE INVENTION

To solve the above mentioned problems, the present invention concerns a bottle, a bottle section, a mixing substance or powder container and a method for operating a bottle. Further advantageous features of the present invention can be found in the dependent claims.

The present invention concerns a bottle comprising a lower section, a container for enclosing and holding a first substance, the container being located inside the bottle, a lid for closing the container, an upper section connected to the lower section and for holding a second substance above the lid, a seal located between the lid and the container to assure that the second substance contained in the upper section does not mix with the first substance of the container and a push-release system to displace the lid to permit mixing of the first and second substances. The push-release system includes the container movably mounted in the bottle between a first position where the container does not act on the lid and a second position in which the entire container is displaced to displace the lid to permit mixing of the first and second substances.

The bottle according to the present invention, to also allow mixing of substances (for example, a liquid and a powder), advantageously also includes a push-release mechanism that further includes attachment means attaching the container to the bottle. The attachment means is also configured to guide a displacement of the container when a pushing force is applied thereto to displace the container from the first position to the second position in which the lid is released for mixing of the substances.

This push-release mechanism advantageously allows the substance or powder container to be of simplified design and form to assure that a minimal amount of material is required for the production of this container and to minimise the environmental impact of the production of such containers. Furthermore, this advantageously assures correct release or removal of the lid from the container.

Moreover, the attachment means carries out multiple functions. The attachment means not only allows the container to be attached to the bottle but additionally functions to guide the displacement of the container to permit the lid to be released for mixing of the substances. This multifunction element of the bottle allows the number of individual single purpose elements of the bottle to be reduced thus also assuring that a minimal amount of material is required for the production of this bottle and minimising the environmental impact of the production of such bottles.

The bottle further includes an actuator to displace the container when an upward pushing force in the direction of the upper section is applied to the actuator by a bottle user, the actuator including an external surface to simultaneously receive a portion of a bottle user's thumb and an upward pushing force applied by the bottle user's thumb to displace said external surface and actuator in an upward direction. This advantageously assures an easy actioning of the bottle as well as easier and quicker mixing of the bottle substances.

The attachment means attach the container to a lateral wall of the bottle. The attachment means being a multifunction element allows the number of individual single purpose elements of the bottle to be reduced assuring that a minimal amount of material is required for the production of this bottle and minimising the environmental impact of the production of such bottles.

The attachment means are configured to guide a displacement of the entire container when a pushing force is applied to the container to displace the entire container. This additionally advantageously assures release or removal of the lid from the container especially in the case where the container is very tightly sealed and to be transported in a very hostile environment such as the bottom of a bag or carried by a person while carrying out a sporting activity.

The attachment means further includes the seal. The attachment means being a multi-function element allows the number of individual single purpose elements of the bottle to be reduced assuring that a minimal amount of material is required for the production of this bottle and minimising the environmental impact of the production of such bottles.

The attachment means is further configured to receive an outer wall of the container and/or to receive the lid to close the container. The attachment means being a multi-function element allows the number of individual single purpose elements of the bottle to be reduced assuring that a minimal amount of material is required for the production of this bottle and minimising the environmental impact of the production of such bottles.

The attachment means is mobile between a lid holding position where the lid is closing the container and a lid released position in which the lid is released for mixing of the substances.

The present invention also concerns a bottle section including a container for enclosing and holding a first substance, a lid for closing the container, a seal located between the lid and the container to assure that a second substance does not mix with the first substance of the container and a push-release system to displace the lid to permit mixing of the first mixing substances. The push-release system includes the container movably mounted in the bottle section between a first position where the container does not act on the lid and a second position in which the entire container is displaced to displace the lid to permit mixing of the first substance.

This push-release mechanism advantageously allows the substance or powder container to be of simplified design and form to assure that a minimal amount of material is required for the production of this container and to minimise the environmental impact of the production of such containers. Furthermore, this advantageously assures correct release or removal of the lid from the container.

The push-release system further includes attachment means attaching the container to the bottle section, the attachment means being further configured to guide the displacement of the container from the first position to the second position when a pushing force is applied to the container.

The attachment means advantageously carries out multiple functions. The attachment means not only allows the container to be attached to the bottle but additionally functions to guide the displacement of the container to permit the lid to be released for mixing of the substances. This multi-function element of the bottle allows the number of individual single purpose elements of the bottle to be reduced thus also assuring that a minimal amount of material is required for the production of this bottle and minimising the environmental impact of the production of such bottles.

The bottle section further includes an actuator to displace the container when an upward pushing force in the direction of the lid is applied to the actuator by a bottle user, the actuator including an external surface to simultaneously receive a portion of a bottle user's thumb and an upward pushing force applied by the bottle user's thumb to displace said external surface and actuator in an upward direction.

The attachment means attach the container to a lateral wall of the bottle section.

The attachment means are configured to guide a displacement of the entire container when a pushing force is applied to the container to displace the entire container.

The seal includes a landing extending into an interior of the bottle to receive the lid.

The attachment means includes the seal.

The attachment means is further configured to receive an outer wall of the container and/or to receive the lid to close the container.

The present invention also relates to a mixing substance or powder container for a bottle enclosing and holding a mixing substance or powder, the container including a base, an enclosing wall extending outwards from the base and delimiting a compartment enclosing and holding the mixing substance or powder, and a bottle connection interface for connection to a bottle connector, the connection interface comprising a recess formed in a rim of the enclosing wall.

The characteristics of the mixing substance or powder container of the present invention thus advantageously assure easy connection and disconnection of the container to the bottle.

Moreover, the container can consequently be of simplified design and form to assure that a minimal amount of material is required to form the compartment holding the substance so that the production of this container has minimised environmental impact. That is, the material used for at least the enclosing wall of the container can be minimised because the enclosing wall now has the double function of (i) holding and enclosing the substance to be mixed and (ii) acting as the connecting interface to the bottle. Known connection interface need a particular minimum quantity of material to be resistant and assure connection to a bottle actuator but the connection interface of the present container is provided by a recess and by removing material from the container. This advantageously minimises the overall quantity of material needed to fabricate the container thus minimising the environmental impact of this container.

The present invention finally, concerns a method for operating the above mentioned bottle or bottle section the method comprising the steps of:
  providing a bottle or a bottle section;
  providing a replacement container enclosing and holding a substance;
  pushing the container inside the bottle section to remove the container from the bottle section; and
  inserting the replacement container into the bottle section and attaching the replacement container inside the bottle or bottle section.

BRIEF DESCRIPTION OF THE FIGURES

The above object, features and other advantages of the present invention will be best understood from the following detailed description in conjunction with the accompanying drawings, in which:

FIG. 8b is a cross-sectional view of the agitator lid illustrated in FIG. 8a.

DETAILED DESCRIPTION OF THE INVENTION

Figure 1:
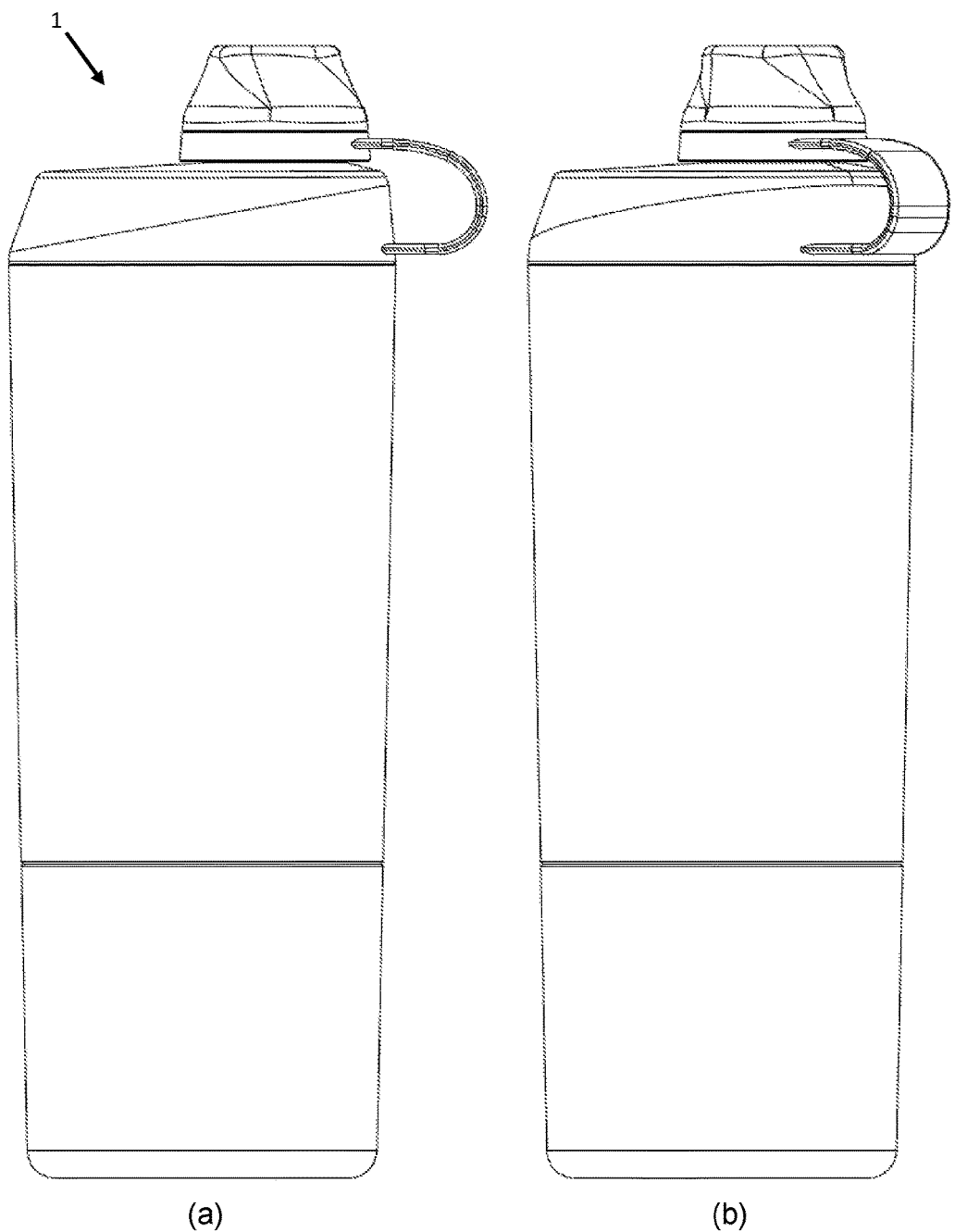
FIGS. 1(a) and (b) are each perspective views of an exemplary embodiment of a bottle according to the present invention.

FIG. 2(a) shows a cross sectional view of an exemplary embodiment of a bottle 1 according to the present invention. The bottle is for example made of plastic. The bottle 1 comprises an upper section 3, a lower section 5 connected to the upper section 3 and a top cap 7 attached to the upper section 3.

The bottle 1 further comprises a container 9 for enclosing and holding a substance to be mixed, and an agitator lid 11 for closing the container 9. The container 9 is movably mounted inside the bottle 1.

The illustrated bottle 1 and bottle components are substantially cylindrical in shape but the bottle 1 and the bottle components can be of a different shape. For example, the lower section, upper section and cap 7 can be substantially square shaped.

The bottle (and its different components) is made, for example, of plastic. For example, Polypropylene (PP) (also known as polypropene), or Polyethylene (PE) or Tritan™ can be used to make the bottle and some or all of the bottle elements.

Poly(lactic acid) or polylactide (PLA) can also be used for some or all of the components of the bottle 1 including the substance container 9. Advantageously, PLA is biodegradable and thus permits to minimise the environmental impact of the production of the bottle 1 and containers 9.

The agitator lid 11 that is attached to the top of the container 9 acts as both a lid when attached, and a mixing facilitator when released. When attached, the agitator lid 11 creates a leak-free seal, assuring that the substance inside will not be released without first releasing the agitator lid 11.

The top cap 7 of the exemplary embodiment comprises a closing member 12 including a lateral inner (female) connecting thread(s) that engage with an external (male) connecting thread(s) located laterally on a neck portion at the upper extremity of the upper section 3. The closing member 12 is substantially cylindrical in shape.

Figure 2:
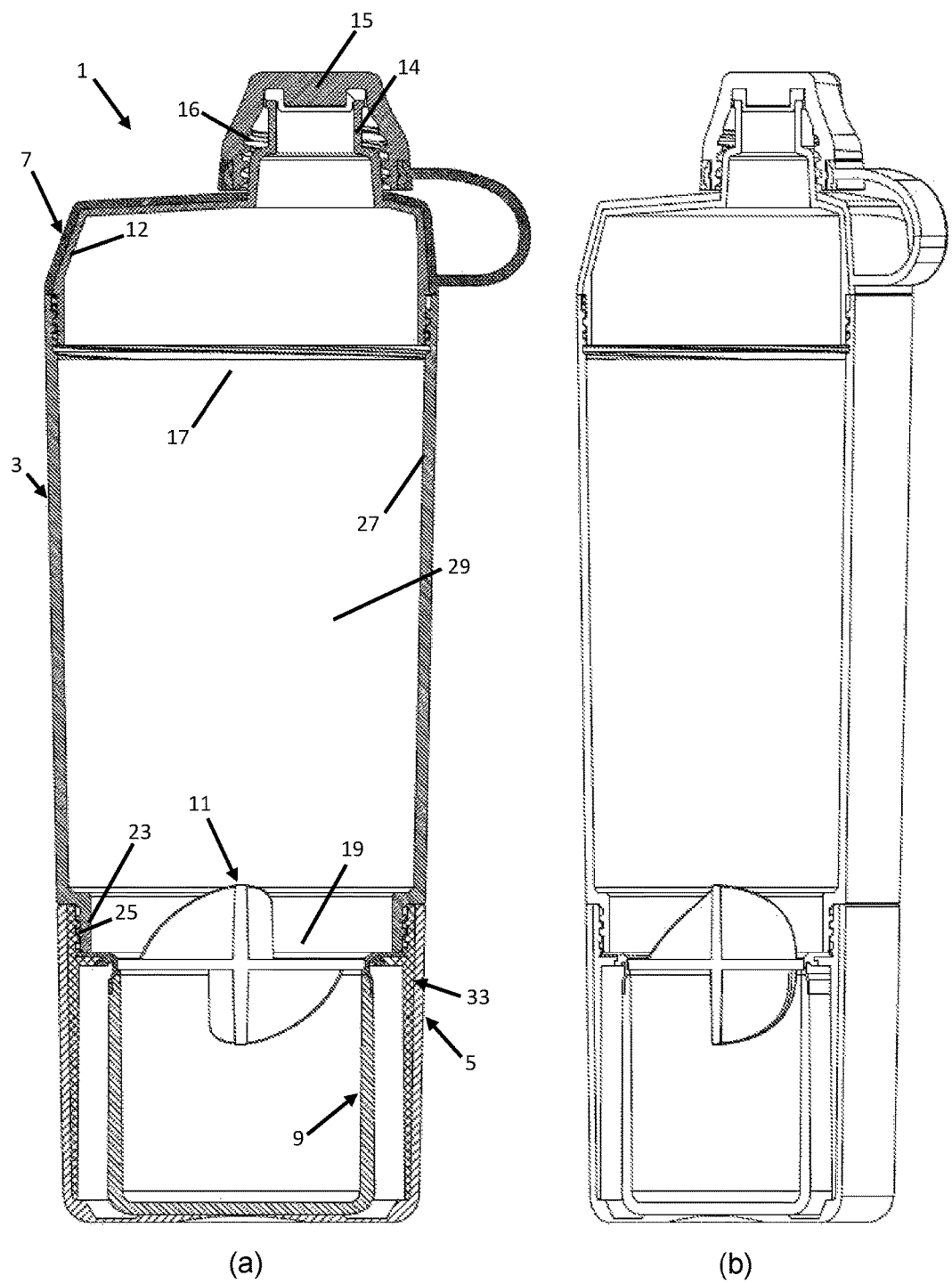
FIGS. 2(a) and (b) are cross-sectional views of an exemplary embodiment of a bottle according to the present invention.

The enclosing member 12 closes the upper section 3 and includes an orifice from which a spout 14 extends permitting the bottle user to insert a substance into the bottle and permitting the bottle user to conveniently drink from the bottle. The enclosing member 12 further includes a plug or cover 15 for sealing the spout 14 to protect the contents of the bottle from outside contamination. The plug 15 includes indentations 16 to facilitate insertion onto the spout 14 and to seal the spout 14 to prevent any substance contained inside the bottle from leaking out when the plug 15 is in place, as illustrated in FIG. 2. The plug 15 can be preferably made out of a soft plastic material, for example, a thermoplastic elastomer (TPE).

The upper section 3 comprises an upper opening 17, and a lower opening 19 at the extremities of the upper section 3. In the illustrated embodiment of FIG. 2, opening 17 is closed by the top cap 7. The upper section 3 is substantially cylindrical in shape.

Figure 9:
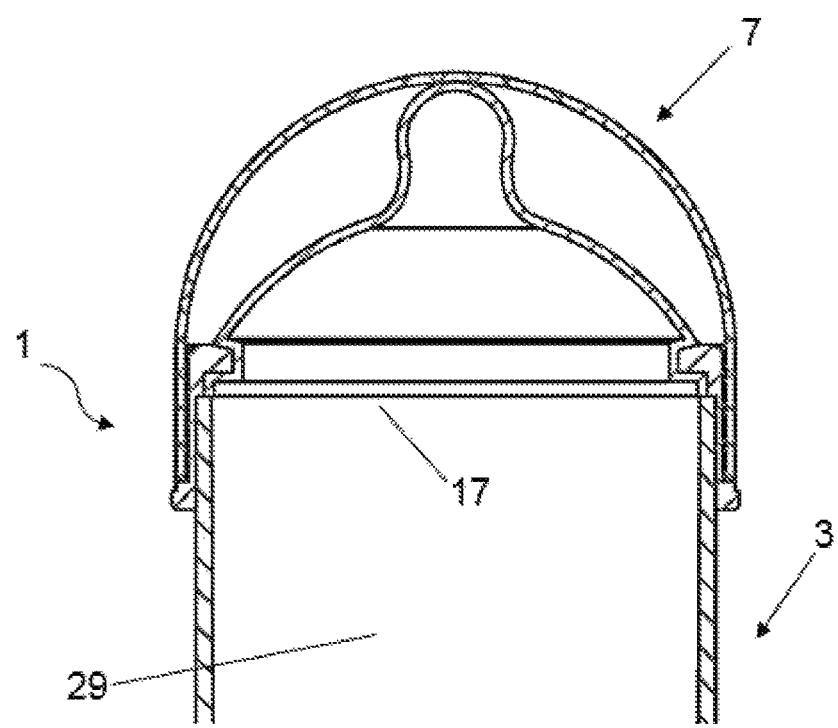
FIG. 9 shows is an alternative exemplary embodiment of the present invention concerning a baby bottle.

Alternatively, the top cap 7 of the exemplary embodiment includes a nipple and an outer cover (see FIG. 9). Opening 17 is closed by the top cap 7. The upper section 3 includes a snap-fit or latch mechanism that engages with an annular recess of the nipple to hold the nipple in place and close upper opening 17. The outer cover is held by press-fit on the upper extremity of the upper section 3. Alternatively, the neck portion of the extremity of the upper section 3 comprising the external (male) connecting thread(s) engages with or is received by an inner (female) connecting thread(s) of a sealing cap to press and hold the nipple at the upper extremity of the upper section 3.

The upper section 3, at a lower extremity, includes a neck portion 23 including an external connecting thread(s) 25. The upper section 3 comprises a cylindrical wall 27 delimiting a chamber 29 destined to receive a first substance such as a liquid. The chamber 29 allows for any type of substance to be stored inside. For example, a powder, a liquid, a gel or a solid can be stored therein. The upper section 3 is configured to hold the substance vertically above the agitator lid 11 and vertically above the container 9.

The lower section 5 includes an intermediate section or holder 33 for receiving the container 9 (see FIG. 3). The holder 33 includes a connecting wall 35 and a connection interface 37 to which the container 9 is connected to hold the container 9 in the lower section 5. The lower section 5 further includes attachment means or an attachment 39 (or fastener) for attaching or fastening the container 9 to the lower section 5. The attachment 39 is an intermediate element that attaches or fastens the container 9 to the lower section 5 and bottle 1. The attachment 39 is, for example, an annular diaphragm as illustrated in FIG. 3.

In the illustrated embodiment, the attachment 39 attaches the container 9 only to a lateral wall of the bottle 1, and preferably to a lateral wall of the lower section 5.

A push-release system of the bottle 1 for displacing the lid 11 and permitting mixing of the substances of the chamber 29 and container 9 includes the container 9 and the attachment 39. The push-release system further includes the connection interface 37.

The lower section 5 includes a base 41 and an annular wall 43. The annular wall 43 extends upwards from the base 41 to define a cavity 45 for receiving the container 9. The lower section 5 is substantially cylindrical in shape (circular base 41 and cylindrical annular wall 43).

The base 41 comprises a body 47 delimiting a recess 49 for receiving an upward or substantially vertical pushing force, for example, applied by a finger or a thumb of the bottle user. The body 47 includes an external surface 50 to receive a portion of a bottle user's thumb or finger and simultaneously receive an upward pushing force applied by the bottle user's thumb or finger to said external surface 50 to displace the external surface 50 and actuator 51 in an upward direction towards the container 9 or lid 11 (or towards upper section 3).

The external surface 50 defines part of the external surface of the lower section 5 of the bottle that is visible or exposed to a bottle user.

An actuator or actioner 51 of the lower section 5 includes the body 47 of the base 41. The actuator 51 displaces the container 9 when activated once an upward pushing force is applied thereto.

The actuator 51 is a non-rotational actuator. The actuator is directly and simultaneously linearly displaced in an upward direction when an upward pushing force is applied to the external surface 50 of the actuator 51.

Figure 3A:
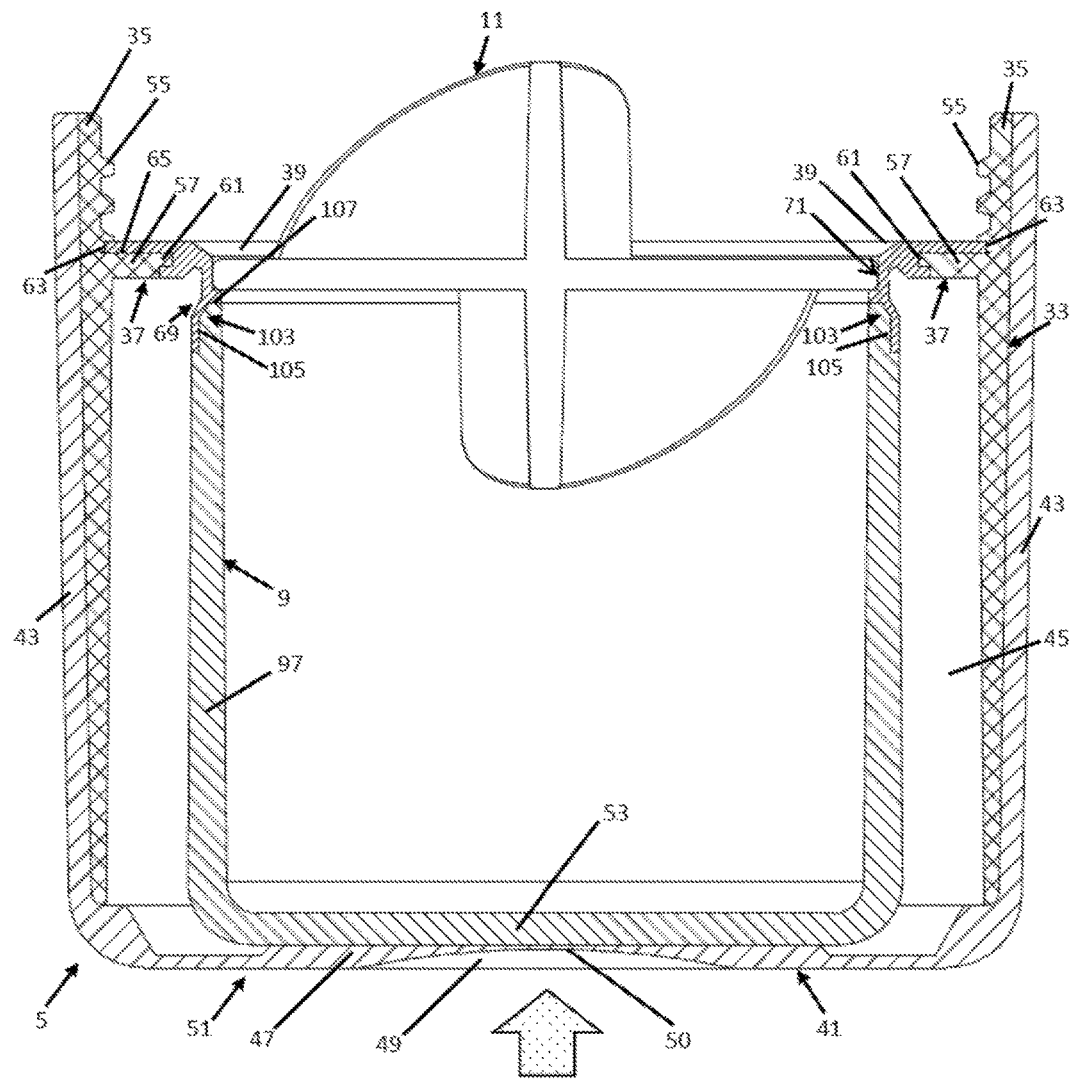
FIG. 3A is a cross-sectional view of a bottle lower section according to the present invention in which a lid is closing a container of the bottle.
Figure 3B:
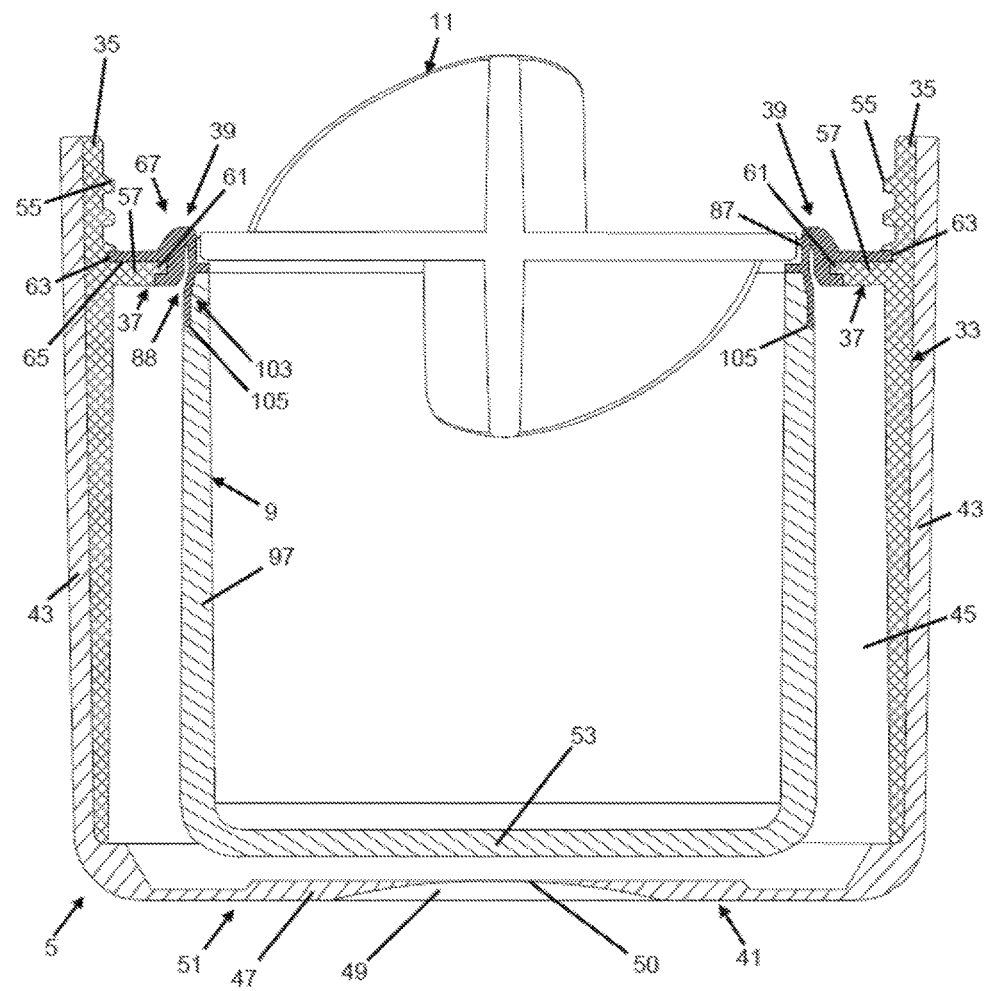
FIG. 3B is a cross-sectional view of a bottle lower section according to the present invention in which a lid is closing a container of the bottle.

The actuator 51 is configured to be displaced between a first position in which the container 9 is sealed by the lid 11 as illustrated in FIG. 3A and a second position in which the lid 11 has been displaced and no longer seals the container 9, as illustrated in FIG. 3B. The actuator 51 is configured to automatically return to the first position when an activation action is longer carried out to it, for example, when a user removes the applied force.

The body 47 is mobile and elastically deformable. The body 47 is fully or partially made of a soft elastic (rubber) material, for example, a thermoplastic elastomer (TPE). When an upward pushing force (for example according to the arrow in FIG. 3) is applied, the body 47 deforms and the pushing force is applied via the body 47 to the container 9 to displace the container 9 upwards.

In an alternative embodiment, the body 47 delimits an opening and the actuator 51 includes a portion of a base 53 of the container 9. In this case, the base 53 includes the external surface 50 on an external surface of the base 53 (surface not contacting the substance to be mixed). An upward or substantially vertical pushing force, for example, applied by a finger or a thumb of the bottle user is applied directly to the base 53 and to the external surface 50 of the container 9 to displace the container 9 upwards.

The lower section 5 can further include side grips (a grip surface) on the exterior surface of the lower section 5, and the upper section 3 can include side grips (a grip surface) on its exterior surface in order to facilitate rotation of the upper section 3 relative to the lower section 5 or vice-versa. This permits the bottle components to be easily mounted and demounted by the user.

The connecting wall 35 of the lower section 5 (FIG. 3A) includes an internal (female) thread(s) 55 on the inner surface of the wall 35 in order to engage with or receive the external thread(s) 25 to connect the upper section 3 with lower section 5 (FIG. 2).

The connecting wall 35 of the present embodiment is a cylindrical or annular wall that is fixed to the annular wall 43 of the lower section 5. For example, the connecting wall 35 and the annular wall 43 can be integrally moulded together or glued together. Alternatively, connecting wall 35 can slot onto or reversibly interlock to annular wall 43 (via a snap fit).

The connection interface 37 comprises a beam 57 that extends outwards from the connecting wall 35. In the illustrated example, the annular beam 57 protrudes from the connecting wall 35 in a substantially perpendicular manner. In the illustrated cross-section of FIG. 3, the beam 37 forms a 'T' shape with the connecting wall 35 where the connecting wall defines the top (hat) portion of the 'T' shape.

Preferably, the beam 57 extends out from the connecting wall 35 at a distance which facilitates the insertion and withdrawal of container 9. Preferably, the beam 57 extends out from the connecting wall 35 at a distance which is less than $(D1-D2)/2$ (see FIG. 4a) where D1 is the inner diameter of the cross-sectional ring formed by the connecting wall 35 at the location of the beam (or the inner distance between connecting walls 35) and D2 is the outer diameter of the cross-sectional ring formed by the container 9 (or the outer distance between container walls).

The beam 57 extends out from the connecting wall 35 at a distance which is less than $(D1-D2)/2$ to facilitate the insertion and withdrawal of container 9.

The beam 57 includes an annular protrusion 61 for engaging with the attachment 39. The connecting wall 35 further includes an annular groove 63 on the inner lateral surface of the connecting wall 35 for engaging with the attachment 39. The annular groove 63 is formed extending inwards into the connecting wall 35 from an upper surface 65 of the beam 57 and substantially parallel to said surface 65 into the connecting wall 35 to facilitate the fixing of attachment 39 to the bottle 1. The upper surface 65 functions as a positioning platform for the fastening of the attachment 39 to the bottle, as further explained later.

The attachment 39 (see FIG. 4b) includes a first connector or connection interface 67, a second connector or connection interface 69 and an interconnector 71 connecting the first connection interface 67 to the second connection interface 69. The interconnector 71 is mobile or capable of being moved.

The attachment 39 is, for example, substantially L-shaped in cross section. The base of the L comprises the second connection interface 69 and the upright portion of the L comprises the interconnector 71 and the second connection interface 69. The intersection defines a first recess or groove and the opposite side of the upright portion includes a protrusion defining a second recess.

The attachment 39 is made of a flexible and elastically deformable material, for example, a soft silica material. Preferably and advantageously, the attachment 39 is made of a thermoplastic elastomer (TPE). The attachment 39 is deformable and mobile between a lid holding position where the lid 11 is closing the container 9 and a lid released position in which the lid 11 is released for mixing of the substances.

The first annular connection interface 67 of the illustrated embodiment includes an annular groove 73 for engaging with the annular protrusion 61 (see also FIG. 3) of the beam 57.

The first connection interface 67 slots onto or reversibly interlocks to lower section connection interface 37 via the annular groove 73 defined by a body 75 of the first connection interface 67, the annular groove 73 engaging with the substantially complementary annular protrusion 61.

The body 75 includes a first tongue or lug 77 that extends from an upper portion of the body 75 and a second tongue or lug 79 that extends from a lower portion of the body 75 substantially parallel to the first tongue 77.

The first tongue 77 and the second tongue 79 delimit the annular groove 73. The first tongue 77 extends further from the body 75 than the second tongue 79 and is longer than the second tongue 79. The length L of the first tongue 77, as measured from the inner extremity of groove 73 (see FIG. 4a), is preferably 5% to 35% more than the protrusion length P of the beam 57 as measured from the inner surface of the connecting wall 35 (see FIG. 4).

The first tongue 77 is between 2 to 10 times longer than the second tongue 79 and is preferable 5 times longer.

Figure 4A:
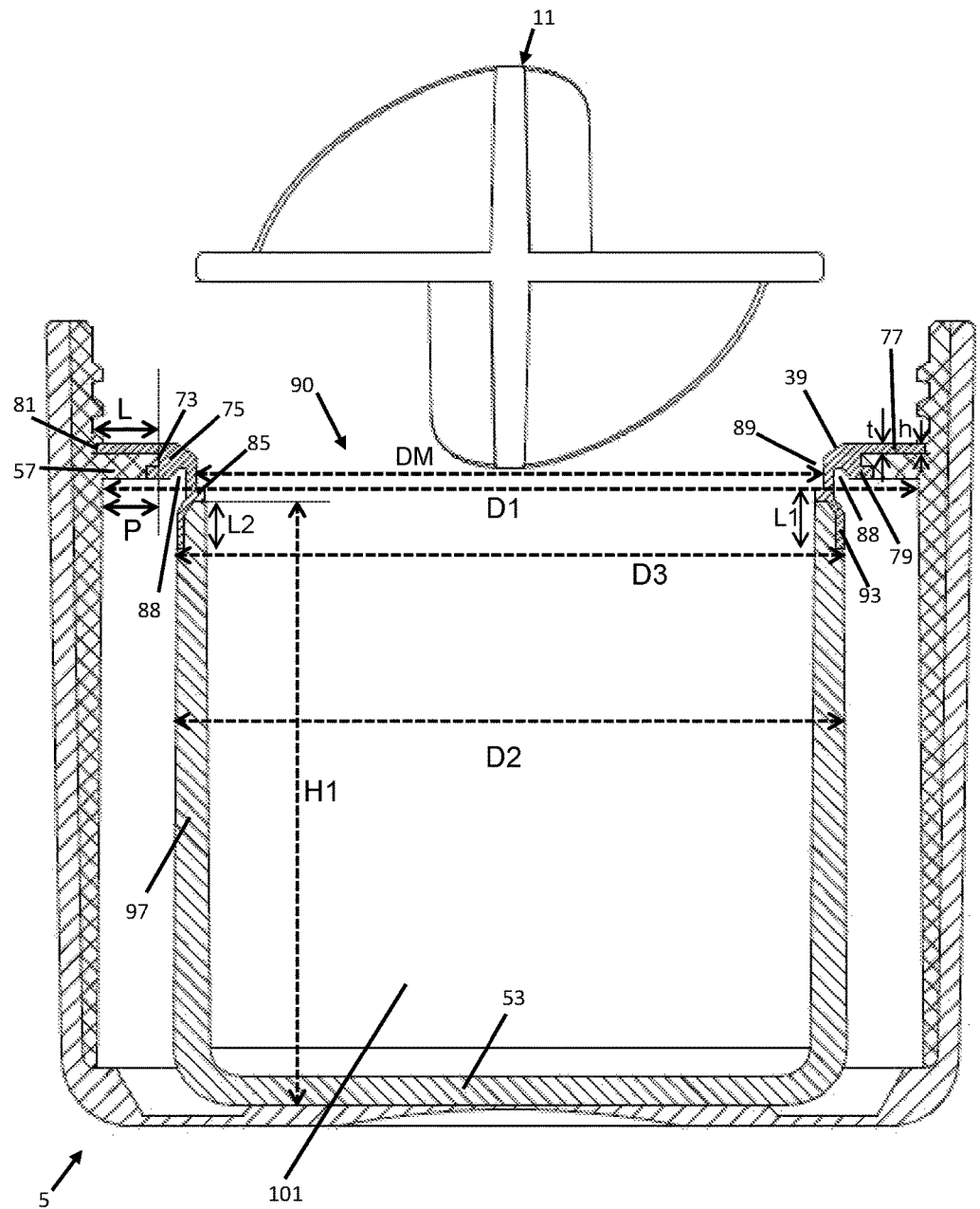
FIG. 4a is a cross-sectional view of a bottle lower section according to the present invention in which a lid is no longer closing a container of the bottle.
Figure 4B:
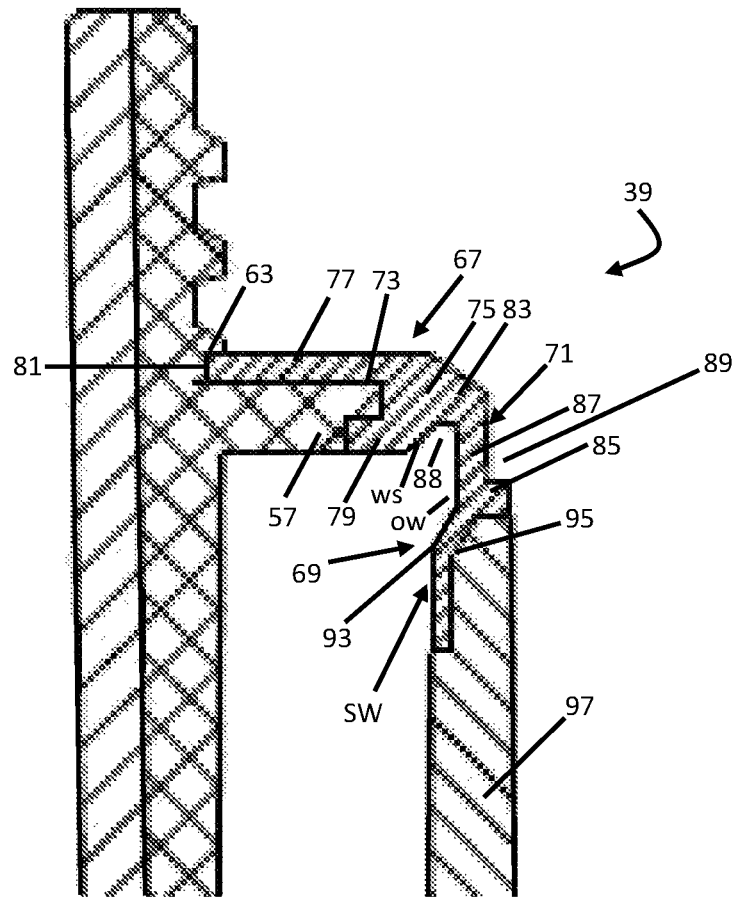
FIG. 4b is a magnification of a portion of the cross-sectional view of a bottle lower section according to the present invention.
Figure 5:
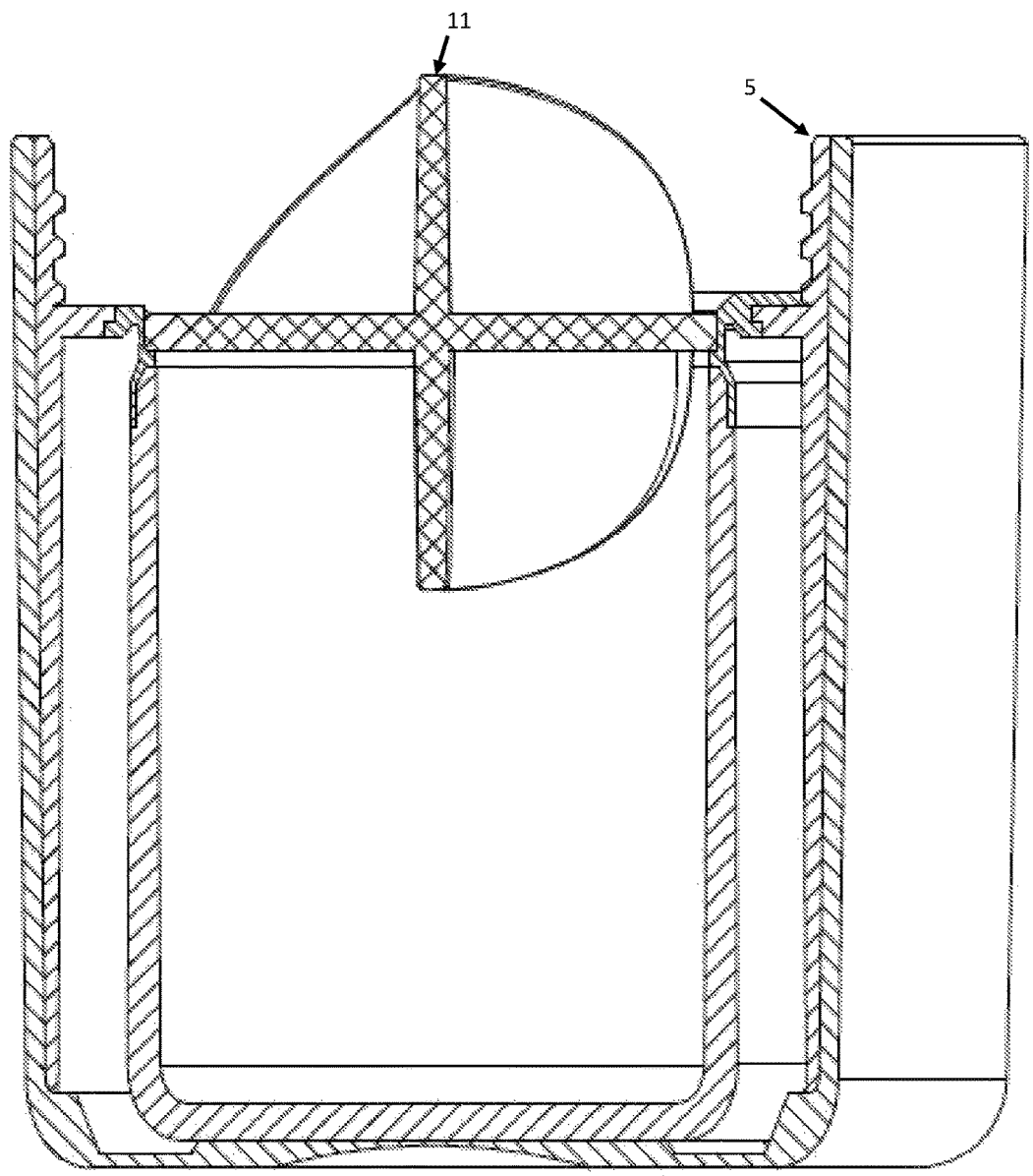
FIG. 5 is a rotated cross-sectional view of a bottle lower section illustrated in FIG. 3.
Figure 6:
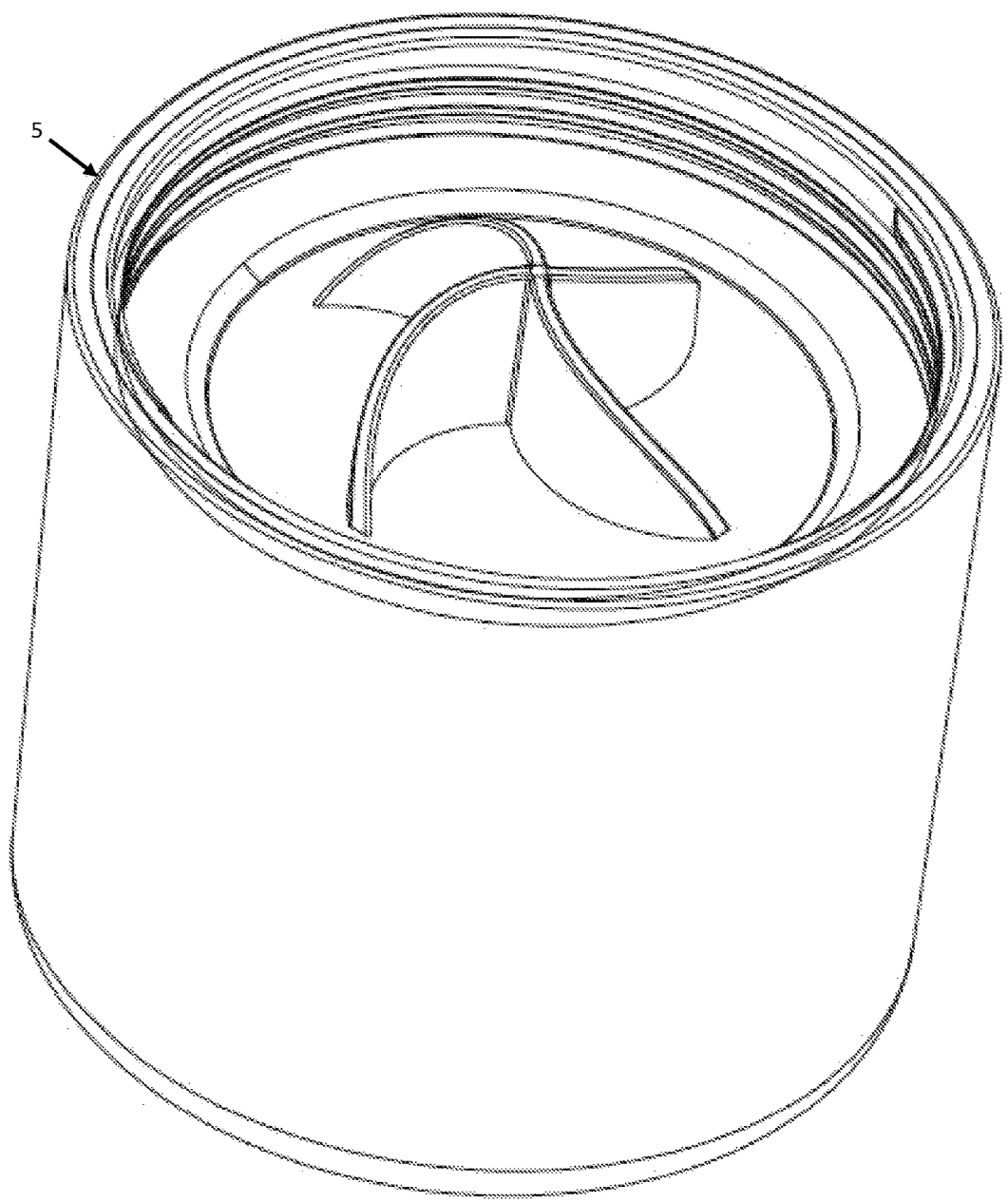
FIG. 6 is a perspective view of a bottle lower section according to the present invention in which a lid is closing a container of the bottle.

The first tongue 77 has a length that allows it to extend to and into the annular groove 63 formed inside the connecting wall 35 (FIG. 4b). A thickness t of the first tongue 77 is substantially equal to or greater than a height h of the groove 63 (for example, between 1% and 10% greater) so as to form a seal to prevent leakage from chamber 29 into the cavity 45 (FIG. 4a).

As mentioned above, the first tongue 77 is made of a flexible and elastically deformable material to allow the first tongue 77 to be inserted and removed from the groove 63 and to form the seal. The outer end 81 of first tongue 77 has a shape complementary to that of the groove 63.

The annular interconnector 71 extends from the body 75 of the first annular connection interface 67 to the second annular connection interface 69.

The annular interconnector 71 includes a first protrusion 83, a second protrusion 85 and a link section or wall 87 connecting the first protrusion 83 to the second protrusion 85 (see FIG. 4b).

The first protrusion 83 extends substantially horizontally from the body 75 (substantially parallel to beam 57) towards the interior of the bottle 1. The link section 87 preferably extends substantially vertically downwards (for example, parallel to wall 43) towards to base of the bottle 1 from the outer extremity of the first protrusion 83. Alternatively, the link section 87 extends downwards towards to base of the bottle 1 at a small angle towards the interior or the exterior of the bottle from the extremity of the first protrusion 83, for example, at an angle less than 20' with respect to the substantially vertical wall 43 of the bottle.

The extension of the first protrusion 83 substantially horizontally from the body 75 and the downward extension of the link section 87 delimits an annular depression or groove 88 located between the first protrusion 83 and the link section 87.

The second protrusion 85 extends substantially horizontally from the bottom extremity of the link section 87 towards the interior of the bottle 1.

The link section 87 and the second protrusion 85 form a socket (or recess) as well as a seal 89. In particular an 'L' shape seal 89 is formed for receiving the agitator lid 11 and for sealing the container 9 when the agitator lid 11 closes the container 9. The socket 89 is directly separated from the groove 88 by the dividing annular wall 87. This permits the flexible interconnector 71 and/or second connector 69 to fill the space delimited by the groove 88 and to push the lid 11 out of the socket 89.

The seal 89 thus includes a wall 87 and a landing 85. In the illustrated example, the seal 89 includes an annular wall 87 and annular landing 85. The seal 89 includes the landing 85 extending outwards into the interior of the bottle 1 to receive and hold the lid 11. The landing 85 extends outwards from the wall 87 towards to the interior of the bottle 1 to receive and hold the lid 11. The landing 85 extends outwards from only one side of the wall 87 towards to the interior of the bottle 1 to receive and hold the lid 11.

The 'L' shape annular seal 89 delimits an opening 90 (see FIG. 4a) through which a substance of the upper section 3 can pass to enter container 9 when the agitator lid 11 is released from the annular seal 89.

The seal 89 in association with the agitator lid 11 assures that the substance contained in the upper section 3 and the substance contained in the container 9 do not unintentionally mix prior to activation of the actuator 51.

Figure 8A:
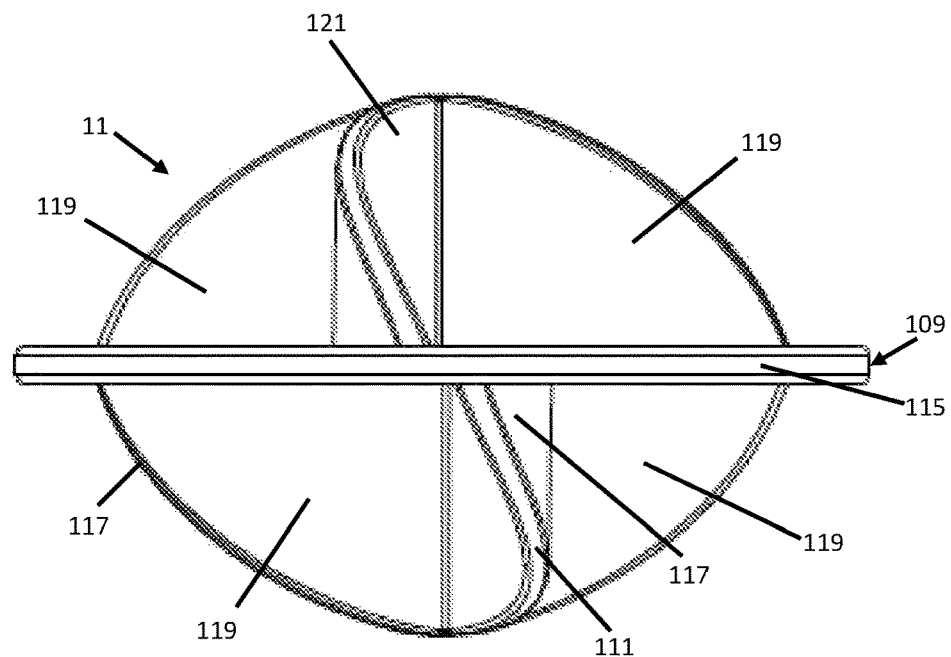
FIG. 8a is a perspective side view of an agitator lid of a bottle lower section according to the present invention.
Figure 8B:
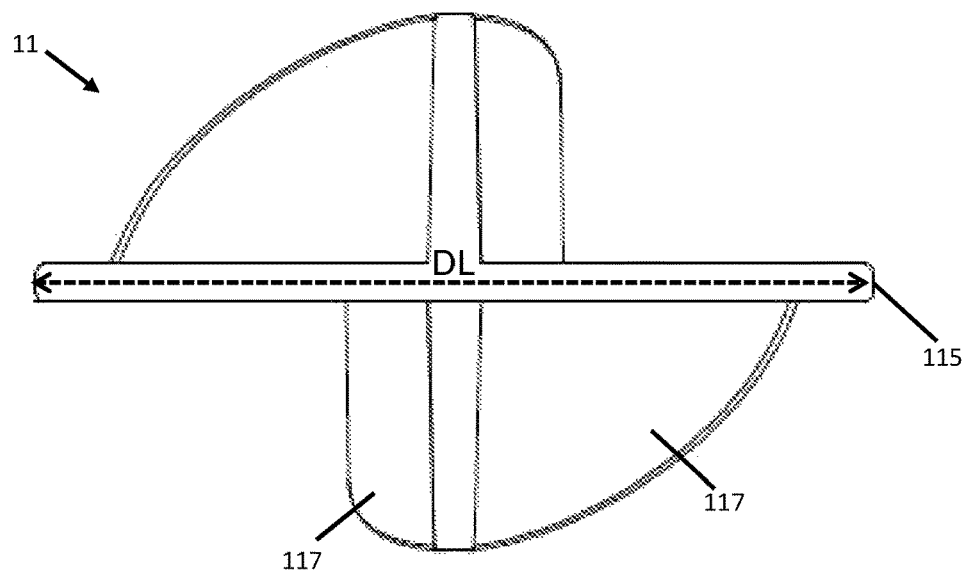

The diameter DM of the seal 89 (FIG. 4a) is substantially equal to the diameter DL of the lid (see FIG. 8b) or preferably the diameter DM is 1% to 5% smaller than the diameter DL of the lid to obtain a tight sealing.

The second annular connection interface 69 includes the above mentioned second protrusion 85 and a rim section 93 (FIG. 4b).

The rim section 93 extends downwards and outwards towards the exterior of the bottle 1 from the second protrusion 85 at approximately a 45° angle and then continually extends substantially vertically downwards (for example, substantially parallel to wall 43) in a direction of the bottom of the bottle 1. The rim section 93 has a length L1 (FIG. 4a) that is between 5% and 25% the height hi of the container 9.

The second annular connection interface 69 is configured to receive an outer border 95 of a wall 97 of the container 9 to attach the container 9 to the lower section 5 and bottle 1.

The container 9 comprises the base 53 from which the annular wall 97 extends upwards to define a compartment 101 for receiving, fully enclosing and holding a substance to be mixed with another substance held in the upper section 3.

The container 9 is substantially cylindrical in shape (circular base 53 and cylindrical annular wall 97) but can have a different form. The compartment 101 allows for any type of substance to be stored inside, for example, a powder to be dissolved in the liquid of the upper section 3. However, the compartment 101 can also store a liquid, a gel or a solid therein.

The container 9 includes a bottle connection interface 103 (FIG. 3) for connection with the attachment 39 and more specifically the complementary second annular connection interface 69.

The bottle connection interface 103 is located at the outer border 95 of a wall 97 of the container 9. The bottle connection interface 103 includes a recess 105 (FIG. 3) formed in the outer rim of the wall 97. In the illustrated embodiment, the recess is formed at the outer surface of the wall 97.

Alternatively, the recess 105 can be formed at the inner surface of the wall 97. In such a case the rim section 93 of the attachment 39 extends downwards and inwards towards the interior of the bottle 1 from the second protrusion 85 at approximately a 45° angle and then continually extends substantially vertically downwards (for example, substantially parallel to wall 43) in a direction of the bottom of the bottle 1.

The recess 105 has a complementary shape to that of the rim section 93 of the second annular connection interface 69. When attaching the attachment 39 to the container 9, the second annular connection interface 69 is slideably mounted onto the bottle connection interface 103.

The recess 105 extends from the outer top surface 107 of the container 9 along the outer surface of the wall 97. The recess 105 extends downwards and outwards towards the exterior of the bottle 1 from the outer top surface 107 at for example approximately a 45° angle and then continually extends substantially vertically downwards (for example, substantially parallel to wall 43) in a direction of the bottom of the bottle 1. The recess 105 has a length 12 (FIG. 4a) that is equal to that of length L1 less the thickness of the second protrusion 85.

Alternatively, the recess 105 can have a 'ґ' shape (inverted L-shape).

The outer diameter D3 of the rim section 93 (FIG. 4a) is substantially equal to the outer diameter D2 of the container 9 so as to maintain the container 9 inside the opening defined by the annular beam 57.

The height H1 of the container 9 (FIG. 4a) is such that the outer top surface 107 of the container 9 contacts the lower surface of the second protrusion 85 and maintains the lower surface of the second protrusion 85 substantially horizontal when the container 9 is placed on an inner surface of the body 47 of the base 41. This permits the agitator lid 11 to be optimally received and held by the attachment 39.

The above mentioned configuration of the annular interconnector 71 is such that when an upward force displaces the container 9 upwardly (as shown in FIGS. 3A, 3B, and 4b), the link section 87 compresses and the link section 87 and/or second protrusion 85 and/or the rim section 93 enter and fill the groove 88. The groove 88 is a guiding recess that allows the displacement of the container 9 to be guided.

The shape (substantially L-shaped) of the link section 87 relative to the first protrusion 83, the flexible nature of the attachment 39 and the location of the groove 88 forms a guide that guides the displacement of the outer rim of container 9 (connection interface 103) when a force is applied to actuator 51 and the bottom of the container 9.

When such a force is applied, firstly, the resulting compression of the link section 87 results in the agitator lid 11 moving upwards and starting to exit the ('L' shape) seal 89 and attachment 39. The link section 87 shortens and is displaced upwards due to the deformation of the attachment 39 and the first connection interface 67 in particular. This guides the displacement of the container 9 in the direction of the opening 90 (and the opening defined by the annular beam 57) and displaces the lid 11 upwards.

Then, the second protrusion 85 almost immediately enters the groove 88 followed by the rim section 93. The outer wall OW of the second protrusion 85 enters the groove 88 followed by the sloped outer wall SW of rim section 93. The shape and deformation of the attachment 39 continues to guide the displacement of the container 9 in the direction of the opening 90.

At this point the lid 11 can, for example, have been sufficiently displaced to longer seal the container 9.

Should the applied force not be vertical and the container 9 is directed to the side of the lower section 5, then the outer wall OW of the second protrusion 85 and/or the sloped outer wall SW of rim section 93 comes into contact with the sloped wall WS of body 75 that also guides the displacement of the container 9 towards the centre of the lower section 5 and in the direction of the opening 90.

The groove 88 that has received the second protrusion 85 and/or the rim section 93 guides the container 9 through the opening 90 as the upward force is applied to release the agitator lid 11 and open the container 9.

Continued application of a force to the actuator 51 can eventually result in the attachment 39 being detached from the annular beam 57.

The attachment 39 deforms and is mobile. At least a portion of the attachment 39 is displaced with the displacement of the container 9.

The attachment 39 is thus configured to guide a displacement of the container 9 when a pushing force is applied to the container 9 that displaces the container 9 from a first position where the lid 11 prevents mixing of the substances, to a second position in which the lid 11 is released for mixing of the substances.

Upon application of an upward or substantially vertical pushing force on the actuator 51, the actuator 51 and the container 9 are displaced upwards and the container 9 is simultaneously displaced in the cavity 45 between a first position and a second position.

The container 9 (for example, fully enclosing and holding a substance to be mixed) is entirely displaced in the cavity 45 while simultaneously enclosing and holding a substance to be mixed. That is, the base 53 and the lateral outer wall(s) 97 of the container 9 forming compartment 101 for holding a substance to be mixed are simultaneously displaced substantially in the longitudinal direction of the bottle 1 (by the actuator 51).

The volume of the container 9 remains unchanged at all times, before, after and during displacement of the container.

The agitator lid 11 (see FIGS. 8a and 8b) includes a substantially circular body 109 that is intersected by a finned body 111. The body 109 closes the container 9 when received and held by the attachment 39. The body 109 includes an outer sealing annular wall 115 at the perimeter of the body 115. The sealing annular wall 115 creates a leak-free seal when the agitator lid 11 is placed in the attachment 39 of the bottle 1 as illustrated in FIG. 3. The seal 89 of the attachment 39 is configured to (fully) receive and enclose the outer perimeter sealing wall 115 of the lid 11 to provide optimum sealing.

The agitator lid 11 comprises or consists of (or is made from) a flexible material (such as plastic) to facilitate insertion onto the container 9 to close container 9.

Figure 7:
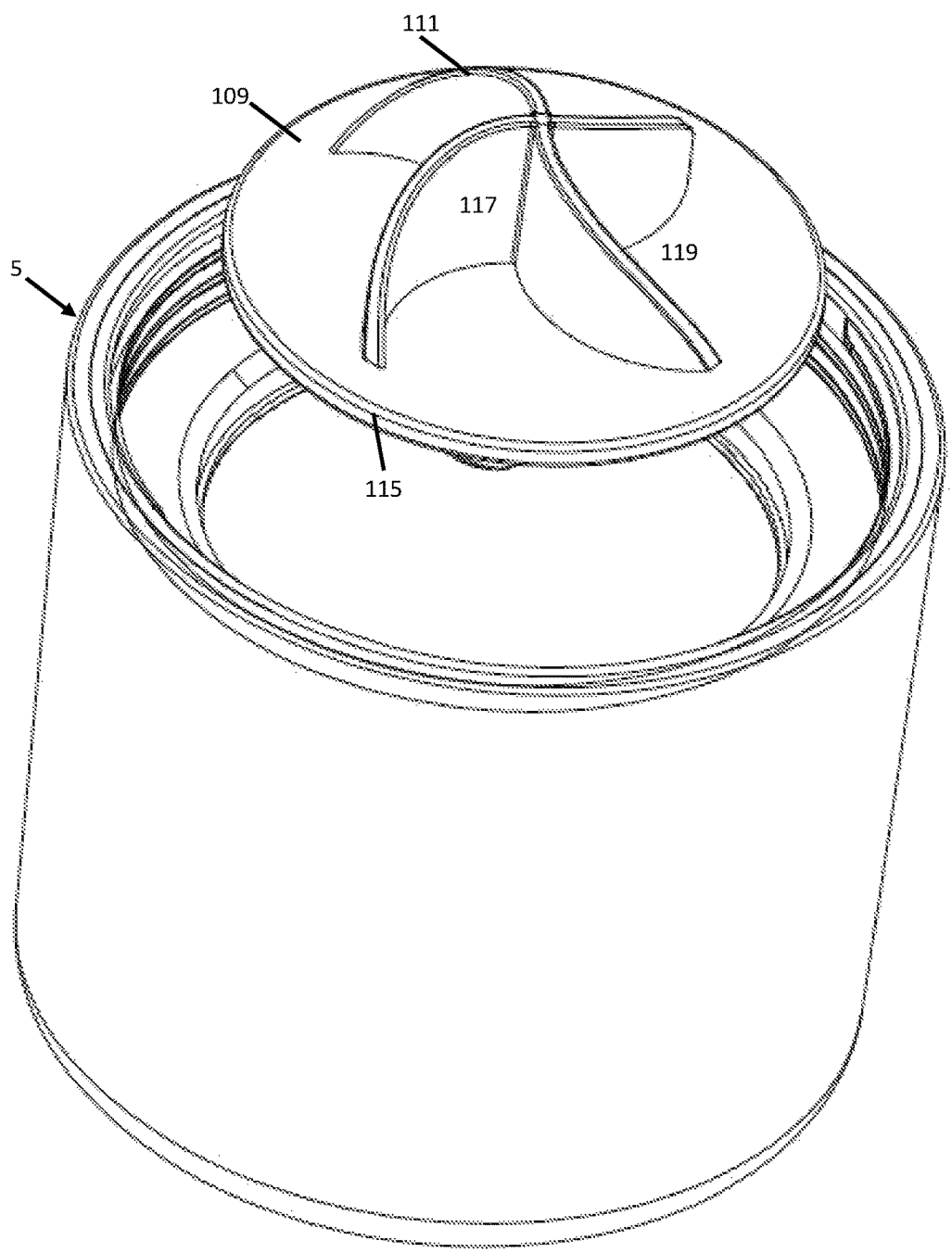
FIG. 7 is a perspective view of a bottle lower section according to the present invention in which a lid is no longer closing a container of the bottle.

The finned body 111 of the lid 11 forms a turbine propeller intersected by the circular body 109. The finned body 111 includes four intersected fins 117 (FIG. 7). The fins 117 delimit, at the interior of circular body 109, eight sections 119 (four on top and four on bottom) each having a curved wall 121. These sections 119 together create turbine-like compartments which allows for much easier and effective mixing of, for example, a powder of the container 9 with a liquid of the chamber 29 or vice versa.

The agitator lid 11 acts as a breaker of the substances to assure lump-free mixing of the substances.

When an upward pushing force is applied to the actuator 51, the container 9 is displaced in the cavity 45 between a first position, in which the container 9 has the agitator lid 11 attached via the attachment 39 and the agitator lid 11 closes the container 9 to isolate the substance contained therein from an outside substance in the upper section 3, and a second position in which the agitator lid 11 of the container 9 is released, or removed to allow mixing of the substance contained in the container 9 with an outside substance present in the upper section 3.

The action of the actuator 51 on the container 9 is fully reversible. That is, the displacement of the container 9 between the first position (FIG. 3A) and a second position (FIG. 3B) where mixing is permitted or occurring can be reversed by removing (or reversing) the upward pushing force applied to the actuator 41 (once the lid 11 has been released) where the container 9 is displaced in an opposite direction with the container 9 moving from the second position to the first position, where the lid 11 can be reattached to the container (if necessary).

The attachment 39 is configured to maintain the container 9 attached to the bottle 1 both when the lid 11 is in a first position assuring that the substances do not mix, and when the lid 11 is in a second removed position no longer closing the container 9.

If an applied upward pushing force is applied to the actuator 51 when the container 9 is in the second position where the agitator lid 11 is removed, the container 9 is displaced beyond the second position where the agitator lid 11 is removed and the container 9 passes through the opening 90 defined by the annular beam 57 and the attachment 39 is removed from the connection interface 37 of the bottle 1. The container 9 and the attachment 39 is then free to be removed from the bottle 1 and lower section 5.

In the preferred embodiment of the present invention, the attachment 39 is a reversible attachment and a non-permanent attachment that can be attached and detached both to the container 9 and the lower section 5. Alternatively, the attachment 39 can be permanently attached both to the container 9 and the lower section 5, for example, permanently glued together.

When the agitator lid 11 is removed from the attachment 37 by the displacement of the container 9, the container 9 is no longer sealed and mixing of the substance contained therein with an outside substance occurs. The agitator lid 11 is non-connected to the lower section 5 or bottle 1 and can be freely displaced inside the bottle 1. Shaking of the bottle 1 by the user will enhance the mixing via the movement of the agitator lid 11 inside the bottle.

Preferably, the chamber 29 and the compartment 101 receive different substances. A substance can be, for example, a liquid, a powder or a gel. For example, chamber 29 holds a liquid and compartment 101 holds a powder destined to be mixed with the liquid of chamber 29, or vice versa.

Advantageously, the attachment 39 is configured to carry out multiple functions. The attachment 39 is configured to: (i) receive and hold the agitator cap 11, (ii) release the agitator cap 11, (iii) receive and hold the container 9, (iv) release the container 9, (v) attach the container 9 to the bottle 1, (vi) release the container 9 from the bottle 1, (vii) guide the container displacement, (vii) seal to prevent leakage and mixing of the substances.

This multi-function element of the bottle 1 and bottle lower section 5 allows the number of individual single purpose elements of the bottle 1 to be reduced thus assuring that a minimal amount of material is required for the production of this bottle as well as the bottle lower section 5 and minimising the environmental impact of the production of such bottles.

The container 9 is for a disposable one-time use that is a disposable one-time use container. After mixing the container 9 is removed and discarded and not reused (but preferably recycled).

The container 9 can be made of plastic as mentioned previously. Preferably, container 9 is produced using Poly (lactic acid) or polylactide (PLA) to minimise the environmental impact of the production of the container 9.

The invention also concerns a method for operating the bottle 1 or the lower bottle section 5 including the steps of:
providing the bottle 1 or the lower bottle section 5;
providing a replacement container 9 enclosing and holding a substance;
applying an upward pushing force or action to the container 9 inside the lower bottle section 5 to remove the container 9 and attachment 39 from the lower bottle section 5; and
inserting the replacement container 9 into the lower bottle section 5 and attaching the replacement container 9 inside the lower bottle section 5.

The attachment 39 is removed with the container 9 and then connected to the replacement container 9. The replacement container 9 with the attachment 39 fixed thereto, via the second annular connection interface 69 that is slideably mounted onto the outer border 95 of the wall 97 of the container 9 and more particularly slideably mounted onto bottle connection interface 103, is placed into the lower section 5 by passing the container 9 through the opening 90 defined by the annular beam 57 to place the container 9 on the base of the lower section 5.

The first connection interface 67 of the attachment 39 is attached to the annular beam 57 by pressing the first tongue 77 against the upper surface 65 of the beam 57 so that the outer end 81 of first tongue 77 enters the groove 63 and the annular protrusion 61 is received in the annular groove 73.

The agitator lid 11 is then inserted into the seal 89 to close the container 9. The upper section 3 and the lower section 5 are connected by engaging the internal (female) thread(s) 55 on the inner surface of the wall 35 with the external thread(s) 25 of the upper section 3. A second substance for mixing can then be inserted into the chamber 29 of the upper section that is then closed by cap 7.

In a preferred embodiment, the substances are a liquid in the chamber 29 and a powder in the container 9.

In use, the user of the bottle 1 according to the present invention takes a container 9 and optionally removes a top protection film if one is present. The container 9 is mounted onto the attachment 39. The attachment and the container 9 are inserted into the bottle lower section 5 and the attachment 39 is fixed to the bottle connection interface 37. The agitator lid 11 is then fitted to the attachment 39 to obtain a bottle with the container, for example, in the position illustrated in FIG. 2. A second substance is then added to the chamber 29 of the bottle 1 and if necessary the cap 7 is connected to the upper section 3.

For substance mixing, the actuator 51 is activated by applying an upward pushing force to the actuator 51 in order to displace the container 9 substantially (vertically) upwards towards the cap 7 to displace the container 9 that simultaneously displaces the lid 11 upwards to release or free the lid 11 from the attachment 39 to open the container 9. This applied force can alternatively displace the lid 11 to a position that is still closing and sealing the container 9 but that permits the lid 11 to be removed from the powder container 9 upon shaking or tilting of the bottle.

This allows mixing of the substance contained in the container 9 with an outside substance present in the upper section 3. Once mixed, the user can, for example, drink the mixed contents from the bottle 1 for example via the spout 14.

The container 9 is displaced in the cavity 45 between a first position, in which the lid 11 is attached and closes the container 9 to isolate the substance contained therein from an outside substance, and a second position in which the lid 11 is released, or removed to allow mixing of the substance contained therein with an outside substance present in the upper section 3.

The container 9 described above has been described as a disposable one-time use container. However, container 9 can be a reusable container of the bottle 1. A user can alternatively refill the container 9 with a substance and reseal the container 9 using the lid 11 when the container is repositioned to the position shown in FIG. 2.

While the illustrated embodiments show a child or adult (non-baby) drinking bottle, there is no difference in construction or operation of the bottle 1 (except for the top cap 7) if used as a baby bottle.

While this invention can be particularly used as a drinking bottle for children and/or adults, it can also be used as a pharmaceutical bottle for holding pharmaceutical substances in a separated manner and mixing these pharmaceutical substances when desired without prior unintentional mixing of the substances occurring.

The bottle of the present invention can be used in a variety of ways. It can be anything from a baby bottle, sports drink bottle, water bottle, protein shaker bottle and many more functions. As the main preferred function is the storage and release of the powder, this technology can be applied to any (cylindrically) shaped bottle that has an open bottom end. This open bottom end allows the present invention to be connected at this open section, acting as both the storage and mixer of the powders, and the base of the bottle.

Pre-measured amounts of mixing powder can for example be stored within a container 9 in the bottle indefinitely. When desired, the user can attach the upper compartment to the bottom, and open the powder holding compartment for example, by applying an upward pushing force to the container 9. This releases the powder and agitator for mixing, allowing for mixing via shaking with minimal effort.

One key aspect of the present invention is that the container 9 can include pre-measured amounts of mixing powder that can be stored indefinitely in the bottle until the user chooses to mix it with the liquid inside the bottle. A second important aspect is the push release system that permits substance mixing and provides an easy and efficient method of mixing the powder with 10 the liquid.

Having described now the preferred and exemplary embodiments of this invention, it will be apparent to one of skill in the art that other embodiments incorporating its concept may be used. It is felt, therefore, that this invention should not be limited to the disclosed exemplary embodiments, but rather should be limited only by the scope of the appended claims.

The invention claimed is:

1. A bottle comprising:
   a lower section;
   a container for enclosing and holding a first substance, the container being located inside the bottle;
   a lid for closing the container;
   an upper section connected to the lower section and for holding a second substance above the lid;
   a seal located between the lid and the container to assure that the second substance contained in the upper section does not mix with the first substance of the container; and
   a push-release system to displace the lid to permit mixing of the first and second substances,
   wherein the push-release system includes the container movably mounted in the bottle between a first position where the container is closed by the lid and a second position in which the entire container is displaced to displace the lid to permit mixing of the first and second substances.

2. The bottle according to claim 1, wherein the push-release system further includes an attachment attaching the container to the bottle.

3. The bottle according to claim 2, wherein the attachment is further configured to guide a displacement of the container from the first position to the second position when a pushing force is applied to the container.

4. The bottle according to claim 3, wherein the attachment further includes a guiding recess to receive a portion of the attachment.

5. The bottle according to claim 3, wherein the attachment includes a guiding recess to receive a portion of the attachment to guide the displacement of the container.

6. The bottle according to claim 2, wherein the attachment interconnects the container and the lid.

7. The bottle according to claim 2, wherein the attachment attaches the container to a lateral wall of the bottle.

8. The bottle according to claim 2, wherein the attachment is configured to guide a displacement of the entire container when a pushing force is applied to the container to displace the entire container.

9. The bottle according to claim 2, wherein the attachment further includes the seal.

10. The bottle according to claim 2, wherein the attachment is further configured to receive at least one of an outer wall of the container and the lid to close the container.

11. The bottle according to claim 2, wherein the attachment is attached to the bottle and mobile between a lid holding position where the lid is closing the container and a lid released position in which the lid is released for mixing of the substances.

12. The bottle according to claim 2, wherein the attachment includes a first connector attached to the bottle, a second connector attached to the container and a mobile interconnector interconnecting the first and second connectors.

13. The bottle according to claim 12, wherein the mobile interconnector includes a socket receiving the lid.

14. The bottle according to claim 12, wherein the attachment further includes a guiding recess to receive a portion of at least one of the second connector and the mobile interconnector to guide the displacement of the container.

15. The bottle according to claim 12, wherein the mobile interconnector includes a dividing wall directly separating the guiding recess and the socket permitting at least one of the mobile interconnector and second connector to fill a space delimited by the guiding recess to push the lid.

16. The bottle according to claim 12, wherein the first connector connects the container to a lateral wall of the bottle.

17. The bottle according to claim 1, further comprising:
   an actuator to displace the container when an upward pushing force in a direction of the upper section is applied to the actuator by a bottle user, the actuator including an external surface to simultaneously receive a portion of a thumb of a user of the bottle and an upward pushing force applied by the thumb to displace the external surface and actuator in an upward direction.

18. A bottle section including:
   a container for enclosing and holding a first substance;
   a lid for closing the container;
   a seal located between the lid and the container to assure that a second substance does not mix with the first substance of the container; and
   a push-release system to displace the lid to permit mixing of the first mixing substance,
   wherein the push-release system includes the container movably mounted in the bottle section between a first position where the container is closed by the lid and a second position in which the entire container is displaced to displace the lid to permit mixing of the first substance.

19. The bottle section according to claim 18, wherein the push-release system further includes an attachment attaching the container to the bottle section; and the attachment is configured to guide a displacement of the entire container when a pushing force is applied to the container to displace the entire container.

20. A baby bottle or adult drinking bottle including the bottle section according to claim 18.

* * * * *